United States Patent Office 3,370,579
Patented Feb. 27, 1968

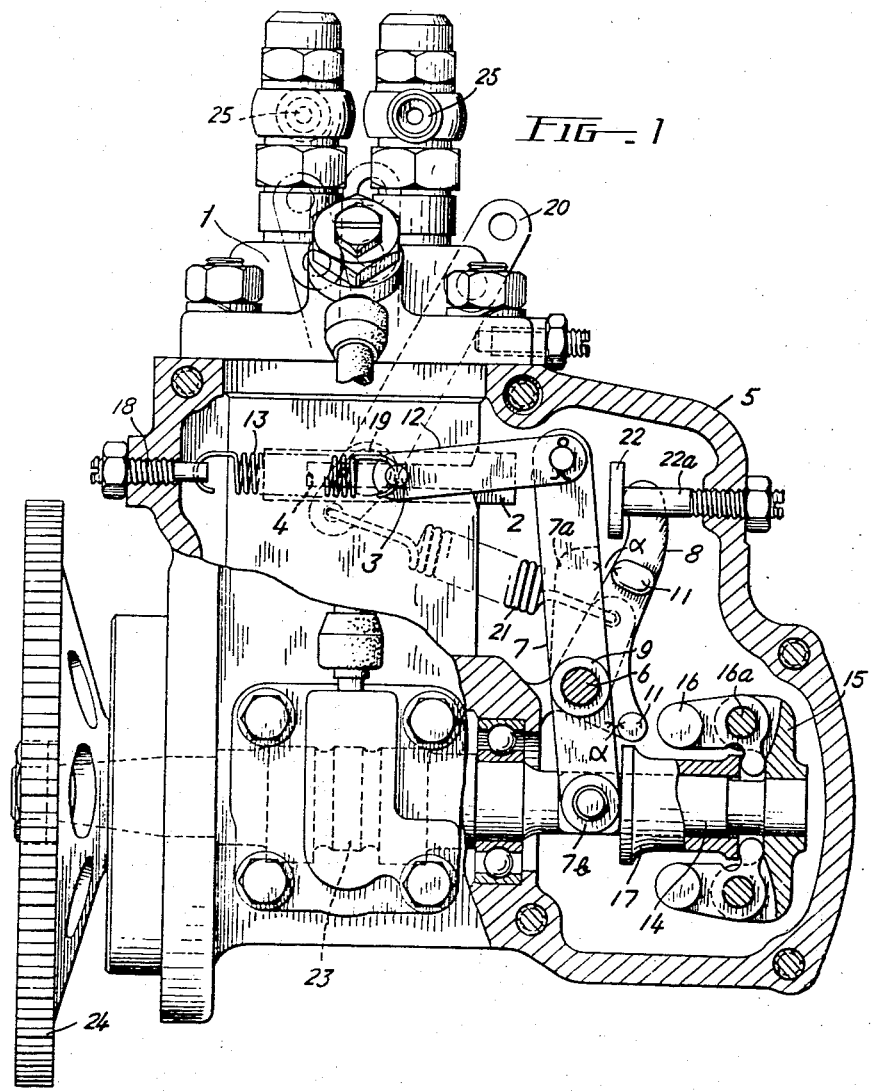

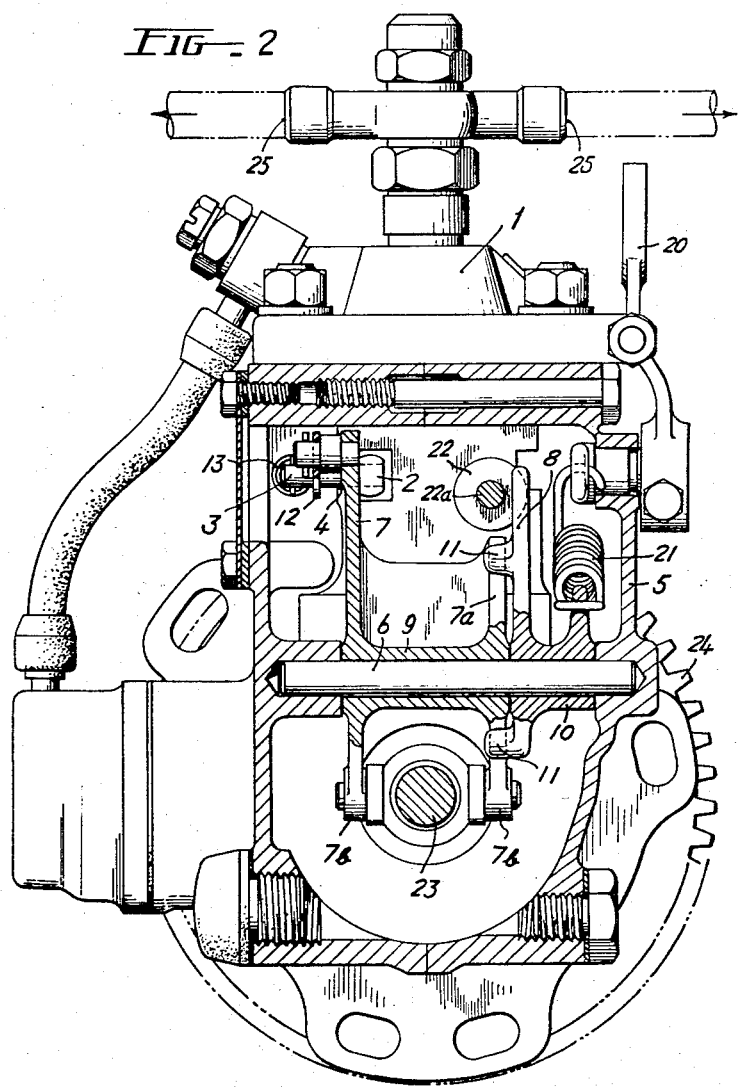

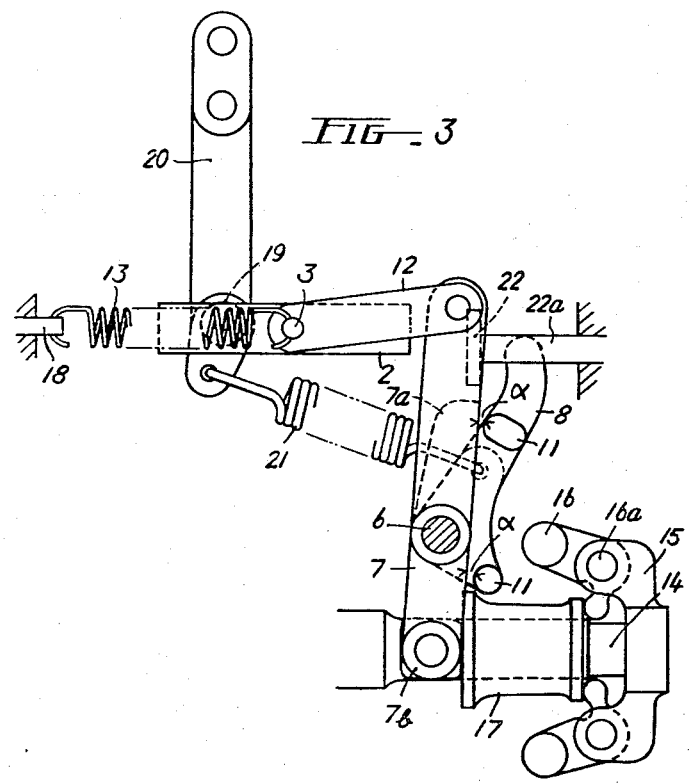

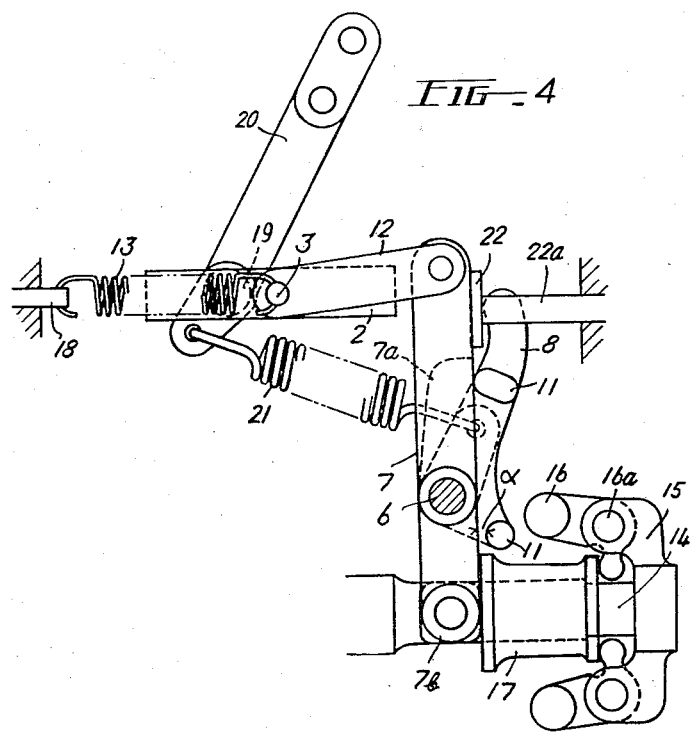

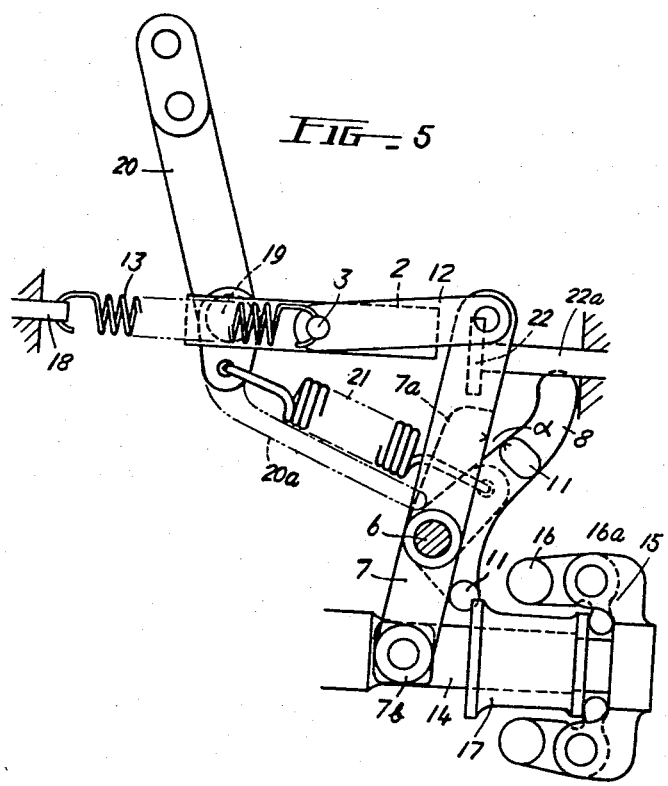

3,370,579
CONTROL APPARATUS FOR FUEL-INJECTION TYPE INTERNAL COMBUSTION ENGINE
Yutaka Nozawa, Tokyo, Yoshinobu Yamaguchi, Warabishi, and Hiroyuki Uchiumi, Kitaadachi-gun, Japan, assignors to Kabushiki Kaisha Honda Gijutsu Kenkyusho, Kitaadachi-gun, Japan
Filed Feb. 8, 1966, Ser. No. 525,916
Claims priority, application Japan, Feb. 18, 1965, 40/8,881
12 Claims. (Cl. 123—140)

ABSTRACT OF THE DISCLOSURE

Control for fuel-injection engine wherein a control member is displaced directly by one lever and indirectly through a lost motion coupling by a second lever operating on the first lever which has a displaceable fulcrum controlled by a governor.

---

The present invention relates to control apparatus for fuel injection in fuel-injection internal combustion engines.

A principal object of the invention is to provide a device wherein not only speed control over an entire speed range, but also stoppage of fuel can be effected by a single member. Additionally, changeover of fuel on starting can be effected also by the same member.

Briefly, apparatus of the present invention comprises first and second levers engaged one with another with an angle of play therebetween and adapted to move together. The first lever is connected to the fuel controller of the injection pump and is urged in amount increasing direction by a low-speed governor spring and towards amount decreasing direction by a thrust force according to the rotational speed of the engine. The second lever is connected through a main governor spring to an operation member and is provided with a full load stopper for limiting the inclination thereof so that by moving said operation member to its neutral position and first and second side positions, there may be obtained conditions wherein the second lever is inoperative, wherein the second lever pushes the first lever in the amount increasing direction and wherein the second lever pushes the first lever in the amount decreasing direction.

According to another feature of the invention, the apparatus is so characterized that when the second lever is inclined to the position where it is stopped by the full load stopper, the first lever is inclined further by the play angle in the amount increasing direction by the action of the low-speed governor spring to cause a changeover of fuel.

An example of the invention will next by explained with reference to the accompanying drawings in which:

FIGURE 1 is a front view partially broken away and in section of a control apparatus for a fuel injection type internal combustion engine provided in accordance with one embodiment of the invention;

FIGURE 2 is a side view partially broken away and partly in section of the apparatus of FIG. 1;

FIGURE 3 is a diagrammatic view of some of the elements of the above apparatus illustrated in position for idling condition (i.e. the neutral position);

FIGURE 4 is a view similar to that of FIG. 3, showing the elements in condition for full load rotation; and FIGURE 5 is a view similar to FIGS. 3 and 4, showing the elements in position for the stop position.

In the drawing, element 1 is a fuel injection pump and element 2 is a fuel controller therefor, the controlling direction of the latter being such that the left side in FIG. 1 is the amount increasing side and the right side is the amount decreasing side. The controller 2 is, for example, in the form of a rack having a pin 3 slidably engaged in a guide groove 4. The present invention apparatus provides for adjustment of controller 2.

A casing 5 is provided on one side of the pump 1 and a shaft 6 is horizontally provided in the interior thereof. A first lever 7 and a second lever 8 are loosely mounted on shaft 6 at their respective bottom end boss portions 9 and 10. These two levers 7 and 8 are engaged one with another, with an angle of play therebetween. The levers are adapted to move together.

More particularly, the second lever 8 is provided on opposite sides of the shaft 6 with engaging projections 11 and these projections engage edges of sub-lever 7a integral with lever 7, in a lost motion arrangement, so that levers 7 and 8 have a free play with respect to each other within the range of an angle of play $\alpha$ but will be accompanied by the other when inclined beyond the angle $\alpha$.

One end of the first lever 7 is connected through a link 12 to the pin 3 of the controller 2 and is inclined to the amount increasing side, that is, to the left in the drawings, by a low speed governor spring 13 acting thereon through the controller 2. The other end of the lever 7 is acted on by a thrust force related to engine rotation speed for being inclined to the amount decreasing side, that is, to the right in the drawings.

Means for obtaining thrust forces according to engine rotation speed may be of any desired type but, in the example shown in the drawing, a centrifugal type governor is used. More particularly, a base plate 15 is attached to a shaft 14 rotating with the engine and a governor weight 16 which tends to move outwardly in accordance with increases in rotational speed is attached to the plate 15 by a pin 16a, a sliding tube 17 on shaft 14 being moved by the weight 16 when the weight is displaced outwardly, thus forming a centrifugal type governor.

The sliding tube 17 is opposed to the rear surface of bifurcated rear end 7b of the first lever 7. The low-speed governor spring 13 is connected at its one end to the pin 3 and at its other end to an adjustable screw 18, so that the strength thereof can be controlled by rotating the screw 18.

The second lever 8 is connected through a main governor spring 21 to an operation member 20 pivotally supported by a pin 19, and there is provided a full load stopper 22 facing the top end of lever 8 to limit the inclination thereof. The main governor spring 21 is formed of closely wound turns. The stopper 22 is adjustably threaded in the casing 5 wall by bolt 22a integral therewith.

The shaft 14 is integrally extended from a cam shaft 23 of the injection pump 1 and is provided at its one end with a driving gear 24. Numeral 25 denotes an exhaust opening of the pump 1.

The operation of the apparatus will be explained as follows:

Idling

If the operation member 20 is moved from the condition of FIG. 1 to the neutral position shown in FIG. 3, the "idling" condition is obtained. If the operation member 20 is moved to the neutral position, the main governor spring 21 slackens and loses its function as a governor spring, the second lever 8 becoming relatively free. The first lever 7 is kept under a balance between the low-speed governor spring 13 and the thrust of the sliding tube 17, and the engine is kept in idling condition.

Full load rotation

If the operation member 20 is inclined to the right as shown in FIG. 4, the main governor spring 21 acts as a tension spring for inclining the second lever 8 to the left to the position where the same is restricted by the stopper 22. This inclining force is exerted through the upper engaging projection 11 on the first lever 7, so that the lever 7 is controlled by this spring and the engine comes to full load rotation.

Even when the operation member 20 is returned slightly towards the neutral position, the first lever 7 is acted on by the main governor spring 21 so that the engine may be controlled at any desired moderate speed of rotation according thereto.

*Stop*

If the operation member 20 is inclined to the opposite side beyond the neutral position, as shown in FIG. 5, the main governor spring 21 acts as a rigid body to incline the second lever 8 and also the first lever 7 to the right through the lower engaging projection 11, so that the controller 2 moves to its right limit position to provide fuel stoppage.

Further, a pushing arm 20a as shown by dotted lines in FIG. 5 can be extended from the operation member 20 towards the second lever 8 so that the second lever 8 is pushed by such arm 20a instead of the main governor spring 21.

*Start*

For obtaining overcharge of fuel on engine starting, the operation member 20 is inclined under engine stop condition to the right as shown in FIG. 1 in almost the same manner as in the case of full load rotation. Thereupon, the main governor spring 21 acts as a tension spring to incline the second lever 8 to the position where the same abuts the stopper 22, and the first lever 7 is inclined further through the play angle to the left by the action of the low-speed governor spring 13, so that the controller is moved further to the left beyond the full load position, whereby is obtained an overcharge of fuel.

Thus, according to the present invention not only can a control from idling to fuel load rotation but also fuel stop be effected by a single operation member, so that the operation and the construction is remarkably simplified compared with conventional techniques that need different operation members. Additionally, in further accordance with the invention, an overcharge of fuel on engine starting can also be effected by the same.

In the above, overcharge of fuel refers to the fact that fuel injection amount on starting must be increased over the amount required for full load operation. Thus, for example, member 3 in FIG. 1 (on starting) is a little to the left of the position in FIG. 4 (full load operation). With reference to the aforesaid angle, its magnitude should be such as to permit the displacement of member 3 from full load to start position.

What is claimed is:
1. For use with an engine having a controllable speed of operation, fuel injection apparatus comprising fuel injection control means, first displaceable means coupled to and adjusting said control means, second displaceable means, lost motion means coupling said first and second displaceable means together with limited play therebetween so that movement of the second means is transmitted to said first means subject to the play therebetween, operating means to displace said second means, governor means responsive to the speed of said engine to control the first means subject to control by said second means and the play between the first and second means, said operating means including an operating member and a spring coupling said member to said second means, limit means to limit the displacement of said second means and thereby said first means, and spring means engaging said first means for yieldably resisting displacement of the latter.

2. Apparatus as claimed in claim 1, wherein said first and second means are pivotal levers and said lost motion means is constituted by at least one extension on one of the levers engaging the other of the levers in such manner as to enable a limited angle of play therebetween.

3. Apparatus as claimed in claim 2, comprising a common shaft supporting both said levers.

4. Apparatus as claimed in claim 2, wherein said governor means includes a rotatable shaft, a tube slidable on said shaft, a weight pivoted on said shaft for radial displacement relative thereto, and means engaging the weight with the tube for sliding the tube on the shaft, the lever of said first means being juxtaposed to said tube to be displaced by the latter.

5. Apparatus as claimed in claim 1, comprising means to adjust the strength of said spring means.

6. Apparatus as claimed in claim 1, comprising means to adjust said limit means.

7. Apparatus as claimed in claim 1, wherein said control means includes a pin coupling said spring and first means.

8. Apparatus as claimed in claim 7, wherein said spring means urges said first and second control means in a direction to increase fuel injection.

9. Apparatus as claimed in claim 8, wherein said operating means is effective through said second means to displace said first and control means against said spring means in a direction to decrease fuel injection.

10. Apparatus as claimed in claim 9, wherein said operating means includes a rigid member on said operating member and adapted to abut said first means to displace the latter.

11. Apparatus as claimed in claim 9, comprising a link between the pin of said control means and said first means.

12. Apparatus as claimed in claim 9, wherein said control means is effective to cause an overcharge of fuel.

References Cited

UNITED STATES PATENTS 2,836,162   5/1958   Dressler _____ 123—140

LAURENCE M. GOODRIDGE, *Primary Examiner.*